US012774257B2

(12) United States Patent
Al-Ghouleh et al.

(10) Patent No.: US 12,774,257 B2
(45) Date of Patent: Oct. 27, 2026

(54) DISPLACED AIR CARBONATION (DAC) PROCESS

(71) Applicant: CARBOCLAVE CORP., Kitchener (CA)

(72) Inventors: Zaid Al-Ghouleh, Montreal (CA); Paul Wayne Hargest, Kitchener (CA)

(73) Assignee: CARBOCLAVE CORP., Kitchener (CA)

( * ) Notice: Subject to any disclaimer, the term of this patent is extended or adjusted under 35 U.S.C. 154(b) by 1339 days.

(21) Appl. No.: 16/651,725

(22) PCT Filed: Sep. 26, 2018

(86) PCT No.: PCT/CA2018/051215
§ 371 (c)(1),
(2) Date: Mar. 27, 2020

(87) PCT Pub. No.: WO2019/060992
PCT Pub. Date: Apr. 4, 2019

(65) Prior Publication Data

US 2020/0255349 A1 Aug. 13, 2020

Related U.S. Application Data

(60) Provisional application No. 62/564,822, filed on Sep. 28, 2017.

(51) Int. Cl.
*B28B 11/24* (2006.01)
*C04B 7/02* (2006.01)
(Continued)

(52) U.S. Cl.
CPC .............. *B28B 11/245* (2013.01); *C04B 7/02* (2013.01); *C04B 40/0231* (2013.01); *C09D 5/00* (2013.01);
(Continued)

(58) Field of Classification Search
CPC .......................... C04B 40/0231; B28B 11/245
See application file for complete search history.

(56) References Cited

U.S. PATENT DOCUMENTS 6,706,384 B1 * 3/2004 Hume ..................... B32B 27/08 428/318.6
8,297,468 B1 * 10/2012 DeLay ...................... F17C 1/06 220/586
(Continued)

FOREIGN PATENT DOCUMENTS

CN 204063793 U 12/2014
CN 104290183 A 1/2015
(Continued)

OTHER PUBLICATIONS

Young, J.F., et al., 1974. Accelerated Curing of Compacted Calcium silicate Mortars on Exposure to CO2. Journal of the American Ceramic Society 57(9), 394-397.
(Continued)

*Primary Examiner* — Edmund H Lee
(74) *Attorney, Agent, or Firm* — DECODE LEGAL INC.

(57) ABSTRACT

The present invention relates to the use of carbon dioxide gas to cure concrete media by applying a pressure differential created through a partial replacement of the original
(Continued)

ambient volume of air present in a curing enclosure with pure CO2 gas.

10 Claims, 4 Drawing Sheets

(51) Int. Cl.

| | |
|---|---|
| ***C04B 40/02*** | (2006.01) |
| ***C09D 5/00*** | (2006.01) |
| ***C09D 175/02*** | (2006.01) |
| ***C09D 175/04*** | (2006.01) |
| *C04B 111/00* | (2006.01) |
| *C04B 111/54* | (2006.01) |
| *C04B 111/56* | (2006.01) |

(52) U.S. Cl.

CPC ......... *C09D 175/02* (2013.01); *C09D 175/04* (2013.01); *C04B 2111/00019* (2025.05); *C04B 2111/00612* (2013.01); *C04B 2111/00646* (2013.01); *C04B 2111/0075* (2013.01); *C04B 2111/542* (2013.01); *C04B 2111/56* (2013.01)

(56) References Cited

U.S. PATENT DOCUMENTS

| | | | | |
|---|---|---|---|---|
| 2013/0167474 | A1 * | 7/2013 | Carlson | F25D 23/028 52/784.15 |
| 2015/0225295 | A1 | 8/2015 | McCandlish et al. | |
| 2015/0240993 | A1 | 8/2015 | DeLay | |

FOREIGN PATENT DOCUMENTS

| | | | |
|---|---|---|---|
| JP | 2005179170 | A | 7/2005 |
| JP | 2016223647 | A | 12/2016 |
| WO | 9804873 | | 7/1997 |
| WO | 199800487 | | 2/1998 |
| WO | 2017041188 | A1 | 3/2017 |
| WO | WO2017041188 | * | 3/2017 |

OTHER PUBLICATIONS

Bukowski, J.M., et al., 1979. Reactivity and Strength Development of CO2 Activated Non-Hydraulic Calcium Silicates. Cement and Concrete Research 9(1), 57-68.

* cited by examiner

DISPLACED AIR CARBONATION (DAC) PROCESS

BACKGROUND

(a) Field

The subject matter disclosed generally relates to the use of carbon dioxide gas to cure concrete media by applying a pressure differential, created through a partial replacement of the original ambient volume of air present in a curing enclosure with pure $CO_2$ gas.

(b) Related Prior Art

The carbonation process engages the calcium-silicate component of Portland cement, namely, tri-calcium-silicate ($3CaO \cdot SiO_2$; $C_3S$—alite) and di-calcium-silicate ($2CaO \cdot SiO_2$; $C_2S$—belite), which make up the majority of cement. The $CO_2$ gas reacts with these calcium-silicates, in the presence of water, to form C—S—H and $CaCO_3$ (according to Equations 1 and 2 below).

$$2C_3S+3CO_2+3H_2O \rightarrow C\text{—}S\text{—}H+3CaCO_3 \quad (1)$$

$$(\text{also}: 2(3CaO \cdot SiO_2)+3CO_2+3H_2O \rightarrow 3CaO \cdot 2SiO_2 \cdot 3H_2O+3CaCO_3)$$

$$2C_2S+CO_2+3H_2O \rightarrow C\text{—}S\text{—}H+CaCO_3 \quad (2)$$

$$(\text{also}: 2(2CaO \cdot SiO_2)+CO_2+3H_2O \rightarrow 3CaO \cdot 2SiO_2 \cdot 3H_2O+CaCO_3)$$

Generally, C—S—H is known as the phase that contributes to the binding of concrete, and is one of the products normally generated by the hydraulic reaction between cement and water (along with calcium-hydroxide at a much lower extent). The rate of formation of this phase is considerably accelerated in the presence of sufficient $CO_2$, which also acts as a reacting reagent that expedites the reaction which results in the precipitation of calcium-carbonate (instead of calcium-hydroxide). For this reason, carbonation is sometimes regarded as an accelerator for the hydration of cement. Early works by Young et al. [1] and Bukowski et al. [2] showed rapid consolidation of calcium-silicate powders subject to short periods of pure $CO_2$ exposure. This physical development is correlated to the equally rapid generation of C—S—H, as per Equations 1 and 2. The $CaCO_3$ crystals that are simultaneously produced from the reaction are found intimately intermingled with the C—S—H at the nanoscale. These nano-$CaCO_3$ precipitates reinforce the C—S—H matrix, resulting in a resilient composite binding matrix.

It would be highly desirable to realize an easily adaptable industrial process that practically exploits carbonation as a means to actively engage Portland cement within the time-frame of a conventional production cycle, thus arriving at a highly resilient concrete precast product characterized for having immediate high C—S—H content, considerably higher strength than commercial benchmarks, and the capacity to beneficially sequester carbon dioxide in the form of physically-reinforcing $CaCO_3$ crystal precipitates.

SUMMARY

This invention presents an alternate process configuration to one covered in U.S. Provisional Patent Application No. 62/217,239—PCT/CA2016/051076, developed to facilitate wider adoption of the Carboclave® technology in existing and new precast concrete plants. The invention introduces a new curing system that can be fairly easily integrated as a design modification to new curing installations or as a physical retrofit to curing processes already in operation. The system marginalizes carbonation's dependency on pressure for the production of Carboclave® concrete products, for whom $CO_2$ is used as the curing agent. Instead of an elevated pressure build-up to promote $CO_2$ diffusion and carbonation, the new system configuration depends on applying a pressure-differential sufficient for the reaction. The differential is achieved by displacing ambient air through suction/vacuum first, followed by $CO_2$ gas injection. The suction could result in a slight sub-atmospheric pressure, which is maintained only momentarily in an effort to purge as much air volume as technically possible by the setup. The presence of a residual volume of ambient air in the curing chamber is minimized, but realistically unavoidable. After the semi-purge, $CO_2$ injection is commenced and regulated such that carbonation is carried out at a slightly positive gauge pressure, anywhere between 0 and 2 psig. Such operating conditions allow conducting carbonation curing in slightly modified conventional steam-curing chambers (the industry's benchmark production process). The presented system and associated process are assigned the abbreviation DAC, for Displaced Air Carbonation.

In accordance with the present invention, there is provided the use of carbon dioxide gas to cure concrete media by applying a pressure differential created through a partial replacement of the original ambient volume of air present in a curing enclosure with pure $CO_2$ gas.

The use of the present invention may further comprise an air displacement step preceding carbonation intended for creating suction and achieving sub-atmospheric pressures within the curing enclosure between 0 and −5 psig.

The use of the present invention may further comprise a purging step preceding carbonation where $CO_2$ gas is continuously flowed into the curing enclosure to displace partial volumes of ambient air through an open outlet, where the outlet is closed when the exhausted air reaches a concentration of $CO_2$ that exceeds 10,000 ppm.

The curing enclosure may reach an internal $CO_2$ concentration between 20 and 50% after the purging step.

The use of the present invention may further comprise a step of regimented injection of $CO_2$ until an internal pressure between 0 and +2 psig is reached and kept constant for the duration of carbonation processing whereby the pressure differential is to create sufficient pressure-head for better gas diffusion within concrete material and to improve carbonation reaction.

The need for pressure during carbonation may be marginalized.

The use of the present invention may be for the preparation of precast or dry-cast concrete products, reinforced and non-reinforced.

The precast or dry-cast concrete products may be selected from the group consisting of masonry units, pavers, synthetic stone, bricks, hollow-core slabs, pipe, wall panels, fiber-cement boards, and retaining walls.

The concrete curing enclosure may be selected from the group consisting of kiln, chamber, autoclave, vessel, tent, wherein the enclosure is designed or modified to be air-tight and capable of withstanding marginal deviations in pressure both below and above ambient conditions.

In accordance with the present invention, there is provided a displaced air carbonation system using carbon dioxide gas to cure concrete media which comprises, an airtight and pressurizable chamber having a composite polyurethane/polyurea sprayed inner lining with a flexible or rigid door assembly, wherein a pressure differential is applied and created through the partial replacement of original ambient volume of air present in a curing enclosure with pure $CO_2$ gas.

The door assembly may be constructed from any one or a combination of materials that include polymer, plastic, aluminum, and/or steel.

The composite inner lining may consist of a primary layer of Spray Polyurethane Foam (SPF) ranging in thickness from 25 to 50 mm, and a secondary layer of polyurea ranging between 2 and 10 mm thickness, where the composite lining is intended to alleviate internal stresses arising from the system's applied pressure differential.

In accordance with the present invention, there is provided a kit to transform a chamber system into an airtight and pressurizable enclosure comprising a composite polyurethane/polyurea sprayed inner lining a polymer sheet door assembly.

The composite inner lining may consist of a primary layer of Spray Polyurethane Foam (SPF) ranging in thickness from 25 to 50 mm, and a secondary layer of polyurea ranging between 2 and 10 mm thickness.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

DAC Process

Figure 1:
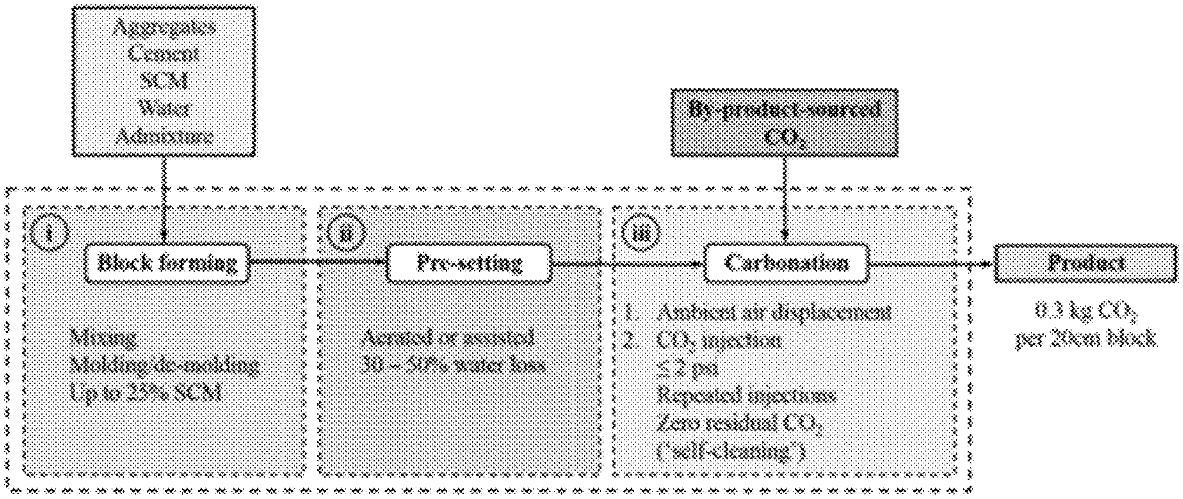
FIG. 1 illustrates a process flow diagram of the DAC process for standard 20 cm concrete masonry unit (CMU) production.

The DAC process presents a methodology for curing concrete articles using carbon-dioxide in lieu of steam (the conventional curing route). Steam generation consumes water and natural gas, both of which are averted with the DAC process. Further savings can be realized from the reduction of cement, the most expensive raw material, with no compromise in meeting building code specifications. Carboclave® concrete products outperform commercial benchmarks in areas of environmental and durability performance, as well as demonstrate considerable improvements in chemical and physical resilience. The DAC process applies to precast concrete products (steel reinforced and non-reinforced) including, but not limited to, concrete masonry units, pavers, pipes, fiber cement boards, and hollow-core slabs. The process can be adapted to existing steam curing systems through physical retrofit modifications without incurring large, non-recoverable capital costs. FIG. 1 is a process flow diagram detailing the steps of the DAC process for 20 cm CMU (concrete masonry unit) production.

The individual steps in FIG. 1 are described in more details below, i. Block forming: This step follows conventional block forming practices, with the only difference being the possibility of proportioning lower cement content. The high strength achieved by the $CO_2$-processed blocks allows for partial offset of cement content (up to 25%) through direct content reduction and/or replacement by cementitious fillers.

ii. Pre-setting: Pre-setting is an important priming step, entailing the close monitoring and control of water-loss experienced by the blocks prior to carbonation. Loss of water creates spaces within the paste component of the wet blocks, thus facilitating the diffusion of $CO_2$ and achieving optimal carbonation degrees. From previous extensive parametric studies, a mass loss in the range of 30 to 50% of the total water in the blocks yields choice results in terms of reaction. The residual water content in the block is somewhat of a critical parameter—too much and $CO_2$ diffusion is hindered as a result of blockage; too little, and cement grains do not engage in reaction due to water starvation. An optimum water content needs to be maintained prior to $CO_2$ exposure. Water in fact serves two vital purposes: it is the medium wherein the $CO_2$ gas solvates and calcium-silicates dissolve; and a reactant in the ensuing multi-step carbonation reaction that generates the composite binding matrix of C—S—H (calcium-silicate-hydrate) and $CaCO_3$.

$$C_3S:\ 2(3CaO\cdot SiO_2)+3CO_2+3H_2O\rightarrow 3CaO\cdot 2SiO_2\cdot 3H_2O+3CaCO_3 \quad (1)\ [1]$$

$$C_2S:\ 2(2CaO\cdot SiO_2)+CO_2+3H_2O\rightarrow 3CaO\cdot 2SiO_2\cdot 3H_2O+CaCO_3 \quad (2)\ [2]$$

Equations (1) and (2) present the generic stoichiometric reactions of cement's main constituents, tri-calcium ($C_3S$) and di-calcium silicates ($C_2S$), respectively, during carbonation. The $CO_2$ gas is ultimately converted into stable $CaCO_3$. Both C—S—H and $CaCO_3$ nucleate in pores previously occupied by water in the wet paste. The C—S—H hydrate is generally known to be responsible for the binding strength of hardened concrete. The rate of formation of this phase is considerably accelerated when calcium-silicates are activated by $CO_2$. Early works by Young et al. [1] and Bukowski et al. [2] showed rapid consolidation of calcium-silicate powders subject to short periods of pure $CO_2$ exposure, where they correlate the effect to an equally rapid generation of C—S—H.

Drying was quantified by monitoring the weight change experienced by representative blocks. The sought drying degree was simplified to an absolute final target weight, based on the formula of Equation 3, which also takes into account the aggregates' absorption property. The equation calculates the weight drop that needs to be experienced by a single block, considering a target loss of 35% of the total water content in this case. Achieving the weight drop marks the end of the pre-setting step. For example, the $WL_{35\%}$ for a NW block with an initial weight of 16.8 kg, and an aggregate absorption of 3%, is 0.349 kg.

$$WL_{35\%}=[(N_{agg.}\times A_{agg.})(M_{block}\times\%\ \text{Water})]\times 35\% \quad (3)$$

$WL_{35\%}$: Mass of 35% target water loss $M_{Agg.}$: Mass of aggregates in block $A_{Agg.}$: Absorption of aggregates $M_{Block}$: Mass of block iii. Carbonation: This step is carried out after the suitably primed concrete products are placed in a curing enclosure and sealed. Once secured air-tight, the enclosure is subject to suction (via use of pump, venturi, compressor, etc. . . . ) for the partial displacement of the ambient volume of air originally present in the enclosure. This can result in a partial vacuum state, possibly recording sub-atmospheric pressures within the enclosure between 0.00 and −5.00 psig. This state is held only briefly until the pressure is brought back to atmospheric (0 psig), and up to a maximum of 2.00 psig, with the injection of $CO_2$ gas. The main purpose of the −ve/+ve pressure differential is to create sufficient pressure-head for better gas diffusion within the concrete material, and, therefore, improved carbonation reaction.

During carbonation, the injection of $CO_2$ gas is carefully regimented to ensure that the concrete media soaks its targeted capacity of $CO_2$ for the given curing conditions and timeframe. This 'self-cleaning' feature was developed to make sure that the injected gas is fully consumed by the concrete—avoiding gas release to the atmosphere at the end of the carbonation cycle. A regulator is used to ensure that the carbonation pressure (between 0 and 2 psig) within the enclosure is precisely maintained. A pressure drop ensues when concrete absorbs $CO_2$, prompting the regulator to counter by replenishing the enclosure with more gas. A flowmeter is used to quantify the total amount of $CO_2$ injected. Once the target capacity of gas that could be absorbed by the concrete charge is reached, the gas supply is then stopped.

To quantify the amount of $CO_2$ that can be absorbed by a concrete charge, Eq. 4 can be used. This will enable precise proportioning of gas injection during carbonation.

$$Q_{CO2}=N\times M_{unit}\times(\%\ \text{Binder})\times U_{CO2} \quad (4)$$

Where, $Q_{CO2}$: Quantity of total $CO_2$ gas to be injected per charge, Kg

N: Number of concrete units charged for curing (e.g. blocks, pavers, pipes)

$M_{unit}$: Average mass of an individual unit, Kg

% Binder: % proportion of binder (i.e. cement) in concrete mix design, %

$U_{CO2}$: Target $CO_2$ uptake, expressed as % binder mass (usually between 15-25%), %

Equation 4 generally applies to precast concrete. From extensive previous trials, the amount of $CO_2$ that could potentially be sequestered by a concrete unit ($U_{CO2}$), under the prescribed processing conditions, is conservatively assumed equivalent to 20% of the initial mass of cement. For example, considering 10 standard normal-weight 20 cm concrete masonry units (CMU), with an average weight of 17 kg per unit and a cement content of 9.7%, the quantity of $CO_2$ that could potentially be absorbed by the charge is 3.3 kg ($Q_{CO2}$=10×17 kg×9.7%×20%).

DAC System

Figure 2:
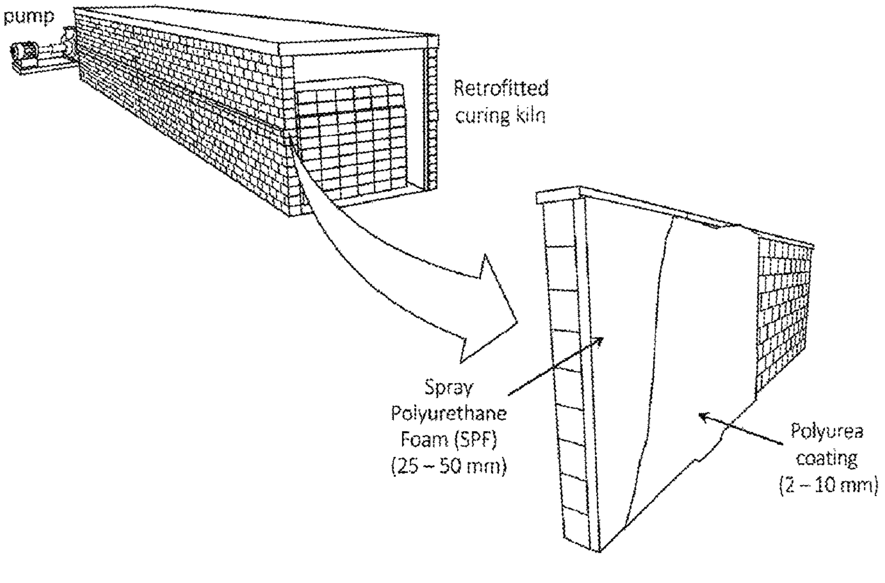
FIG. 2 illustrates a schematic illustration of a typical full-scale curing chamber converted to a DAC curing system.

The assembly of the DAC curing system is detailed in this section, with the described embodiment adaptable to both new and existing steam curing installations. Adaptation generally transforms any curing system (kiln, vessel, chamber, etc. . . . ) into an air-tight enclosure, capable of withstanding a pressure differential ranging from −5 psig during suction and up to 2 psig during carbonation. FIG. 2 illustrates a typical full-scale DAC curing system, representing a modified version of the most commonly used steam-curing chamber. The inset of the figure is a close-up of the wall cross section, which reveals a composite inner lining composed of two successively sprayed layers. The wall cross section reveals a composite polyurethane/polyurea inner lining. The first layer is a 25-50 mm thick Spray Polyurethane Foam (SPF) material, usually used for insulation purposes in construction. The second layer is that of a flexible 'polyurea' material ranging in thickness between 2 and 10 mm. Both materials exhibit high tolerance for elastic deformation.

Figure 3:
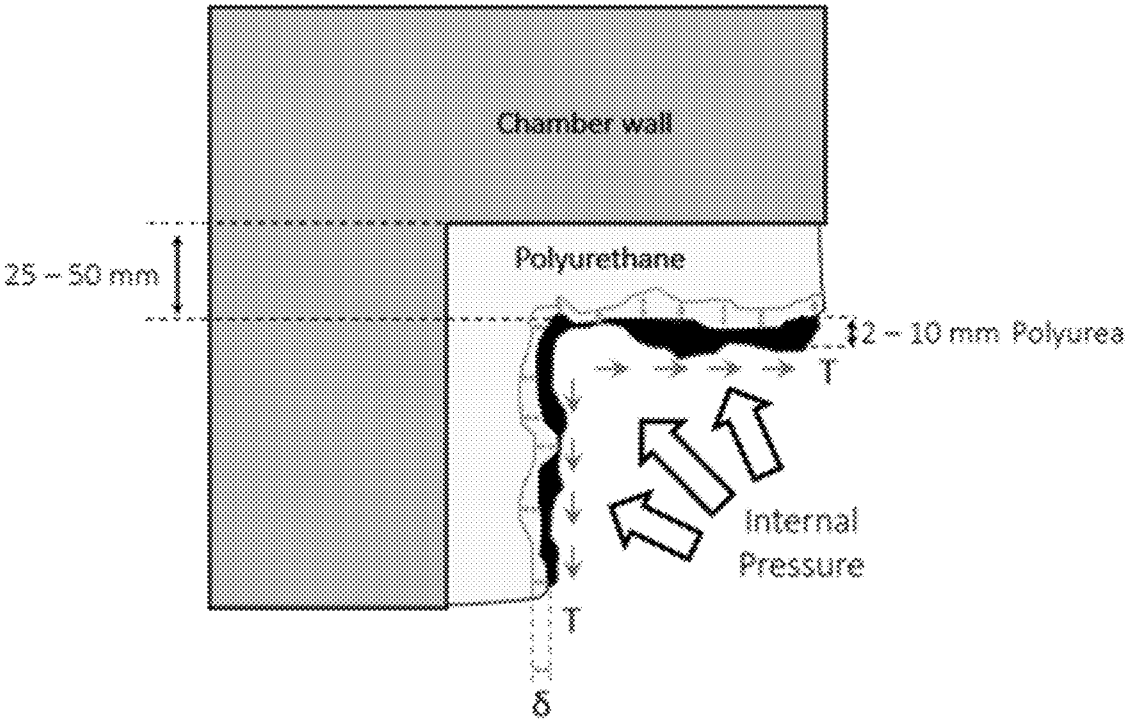
FIG. 3 illustrates a cross-section of the DAC system's composite inner wall lining.

The composite lining alleviates stresses acting on the interior walls of the enclosure and arising from the applied pressure differential. It creates a bladder-like compartment that considerably negates dimensional changes imposed during operation. The air displacement step prior to carbonation is administered to create suction and achieve a sub-atmospheric pressure anywhere between 0 and −5 psig. However, the vacuum effect is kept marginal to avoid delamination of the inner lining. When the concrete-loaded enclosure is inflated during carbonation, the internal pressure buildup is mostly contained by the lining through material tension and deformation. FIG. 3 illustrates the internal load dissipation during inflation. The polyurea layer experiences a slight volumetric expansion, which translates into tensile forces within the material. The expansion additionally results in the dimensional deformation of the SPF layer (δ), which in turn absorbs some of the load created by the internal pressure. The dual alleviation effect presented by the composite inner lining minimizes the direct pressure acting on the actual chamber walls. In this manner, a non-compressible chamber can be converted into an airtight, compressible curing setup, without incurring any major structural modifications to the chamber.

There are many types of sprayed and non-sprayed polyurethane foam and polyurea coatings that can be used whose composition, density, and mechanical properties vary significantly. Not to restrict the invention to using a specific product or brand, a general material conformity criteria is presented to ensure proper application of the inner lining component. The primary foam (SPF or other spray foams) layer needs to be adhesive, porous, and slightly malleable such that it is elastically compressible when a load is acting on the inner lining. The SPF layer is preferred to be medium-density closed-cell spray foam (ccSPF). Light-density open-cell spray foam (ocSPF) can also be used. The secondary polyurea layer (or other equivalent spray polymer or elastomer material) needs to be seamless, highly adhesive, and possess superior tensile strength (>20 MPa) and capable of achieving >200% elongation. Self-healing elastomer polyurea can also be used. In general, any lining system, comprised of one or more components, conforming to the abovementioned attributes, and serving the intended functionality, can be interchangeable with the prescribed embodiments.

Figure 4:
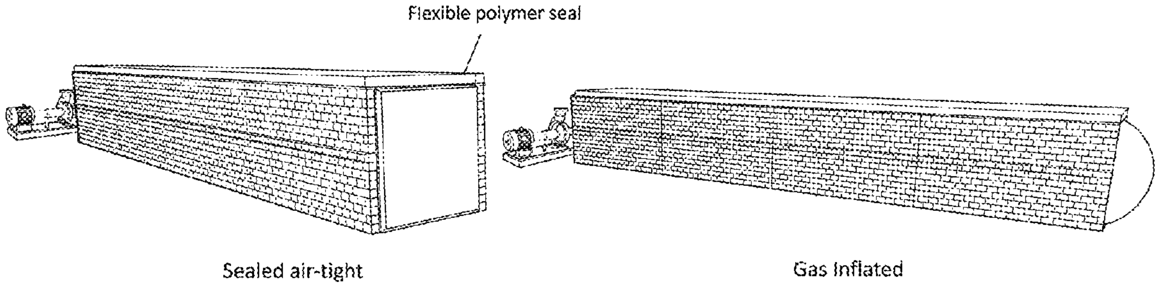
FIG. 4 illustrates a DAC curing system before and after commencing carbonation curing.

Another important feature of the DAC system is the door assembly, where a flexible polymer sheet is used and affixed to the open-end of the enclosure. After the concrete charge is loaded, the polymer door is tightly fastened/clamped such that the enclosure is completely air-tight. The thickness of the door can be adjusted according to the required tensile properties (>20 MPa). Prior to carbonation, the suction pump is used to partially displace the ambient volume of air present in the enclosure. The flexible polymer door provides a visual indicator for this step, where the sheet would deflate internally. Once a sufficient amount of air is exhausted, carbonation is commenced by injecting $CO_2$ gas until the enclosure becomes inflated and an internal pressure between 0 and 2 psig is maintained throughout the course of carbonation. Again, the polymer sheet protrudes outward during carbonation, as shown in FIG. 4. Carbonation is prolonged until the target quantity of $CO_2$ ($Q_{CO2}$) is fully injected.

Proof-of-Concept

Figure 5:
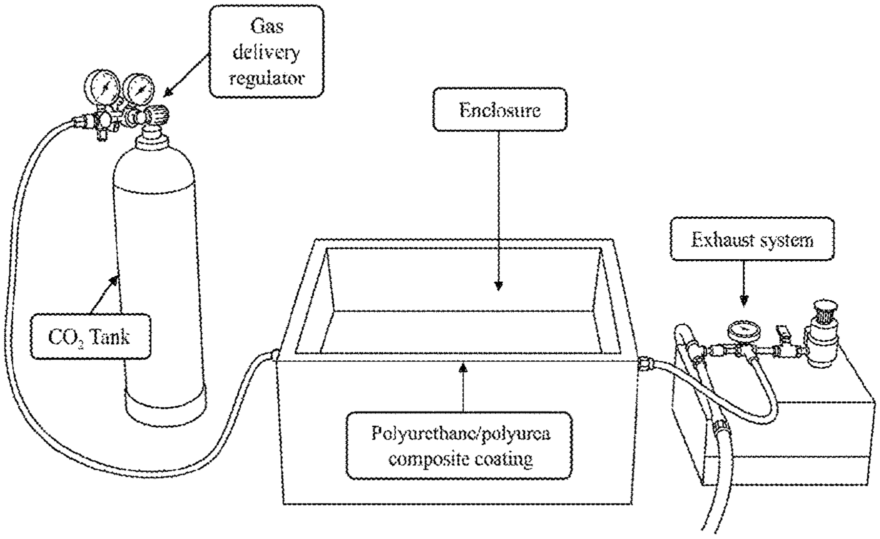
FIG. 5 illustrates a DAC system prototype.
Figure 6:
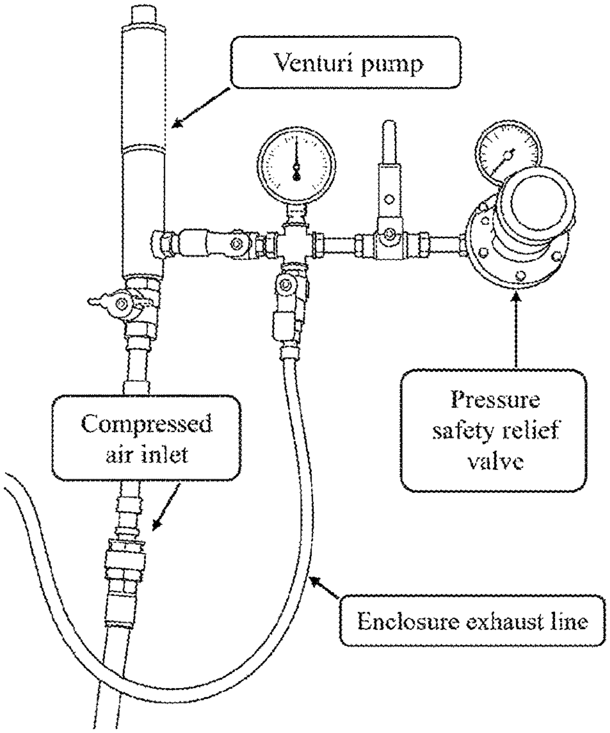
FIG. 6 illustrates a prototype's air displacement exhaust system.

A scaled-down proof-of-concept of the DAC system and process was carried out at the site of a concrete masonry unit (CMU) plant. Locally produced CMU blocks were subjected to DAC processing using the prototype shown in FIG. 5. For the enclosure, a wooden box was used with its interior first sprayed with a 50 mm thick SPF layer (Bayseal 2.7 Insulthane by Elastochem), followed by a 2 mm layer of polyurea (9511 HT by Elastochem). High-purity liquefied $CO_2$ gas was used, with injection controlled by a fine range valve and regulator. FIG. 6 shows the air displacement exhaust system. A venturi pump was used to create the suction needed to partially displace the ambient volume of air prior to carbonation.

Figure 7:
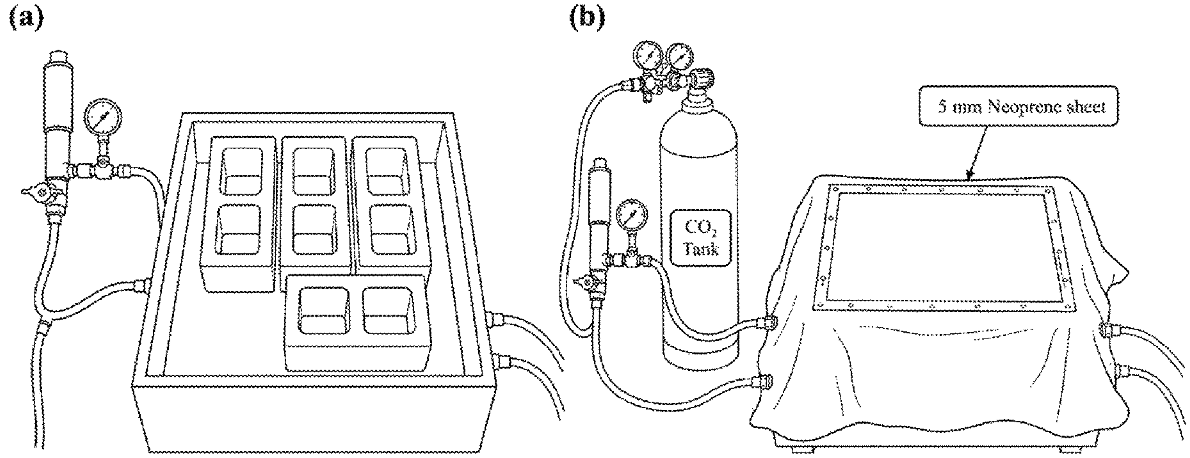
FIG. 7 illustrates (a) enclosure loaded with standard 20 cm CMU blocks; (b) a 5 mm Neoprene polymer sheet securely fastened making the enclosure air-tight.
Figure 8:
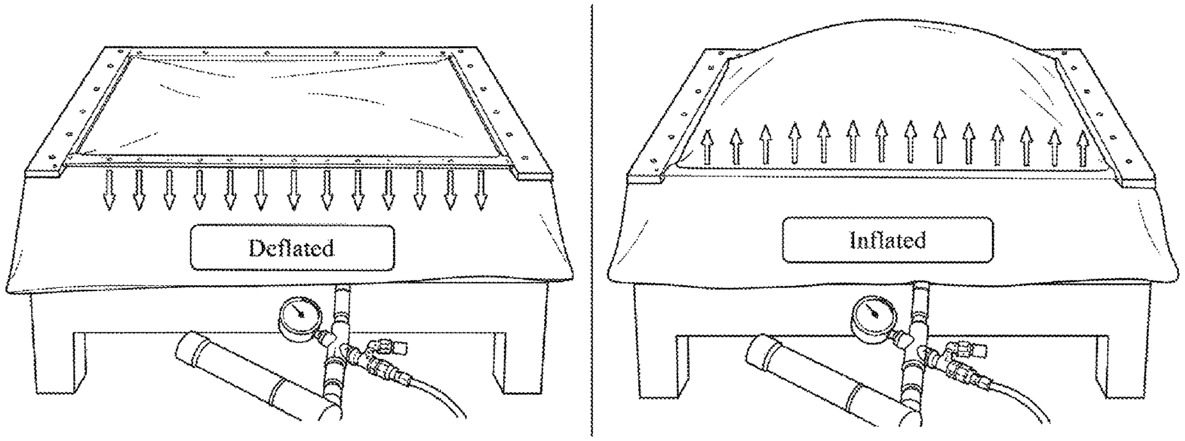
FIG. 8 illustrates DAC enclosure system when deflated via suction, and when later inflated to a constant pressure of 0.5 psig during carbonation.

Once the primed concrete blocks are placed inside the enclosure (FIG. 7(*a*)), a 5 mm Neoprene polymer sheet is securely fastened using screws and a high-pressure sealant (X-Trasil H.T.), as shown in FIG. 7(*b*). Air within the enclosure was then evacuated using the venturi pump, with the pressure gauge reading a sub-atmospheric pressure of −3 psig after 5 to 10 minutes. The resulting suction resulted in an inward deflection of the polymer sheet, like shown in FIG. 8. The injection of $CO_2$ gas was commenced shortly after until a positive pressure of 0.5 psig was achieved and maintained throughout the carbonation step, which lasted about 10 hours. FIG. 8 also shows the inflated state of the enclosure during carbonation. Carbonation was prolonged until the target quantity of $CO_2$, that could be absorbed by the blocks, was supplied ($Q_{CO2}$=1.33 kg $CO_2$ using Eq. 4).

The final blocks achieved an average $CO_2$ uptake of 310 g and an average 1-day compressive strength of 38 MPa.

While preferred embodiments have been described above and illustrated in the accompanying drawings, it will be evident to those skilled in the art that modifications may be made without departing from this disclosure. Such modifications are considered as possible variants comprised in the scope of the disclosure.

REFERENCES

Young, J. F.; Berger, R. L.; Breese, J. 1974. Accelerated Curing of Compacted Calcium silicate Mortars on Exposure to $CO_2$. Journal of the American Ceramic Society 57(9), 394-397.

Bukowski, J. M.; Berger, R. L. 1979. Reactivity and Strength Development of $CO_2$ Activated Non-Hydraulic Calcium Silicates. Cement and Concrete Research 9(1), 57-68.

The invention claimed is:

1. A process for curing concrete media comprising:

an air displacement step, at least partially replacing a volume of ambient air with pure $CO_2$ gas, the ambient volume of air originally occupying an airtight, pressurizable curing enclosure containing the concrete media, the air displacement step preceding concrete carbonation, wherein the airtight, pressurizable curing enclosure comprises an inner wall, the inner wall being successively spray-lined with a composite lining, the composite lining consisting of a first layer of spray polyurethane foam (SPF) material and a second layer of polyurea material and wherein the airtight, pressurizable curing enclosure is equipped with a flexible or rigid airtight door assembly to be airtight and pressurizable.

2. The process of claim 1, wherein the air displacement step preceding carbonation comprises creating suction and achieving sub-atmospheric pressures within the airtight, pressurizable curing enclosure between 0 and −5 psig.

3. The process of claim 1, wherein the air displacement step preceding carbonation comprises a purging action step where $CO_2$ gas is continuously flowed into the airtight, pressurizable curing enclosure to displace partial volumes of the ambient air through an open outlet, where the outlet is closed when the $CO_2$ concentration of the exhausted air exceeds 10,000 ppm.

4. The process of claim 3, wherein after the purging step, the airtight, pressurizable curing enclosure reaches an internal $CO_2$ concentration between 20 and 50%.

5. The process of claim 2, further comprising a step of regimented injection of $CO_2$ until an internal pressure between 0 and +2 psig is reached and kept constant for the duration of carbonation processing whereby the pressure differential creates sufficient pressure-head for better gas diffusion within the concrete media and improves the carbonation reaction.

6. The process of claim 1, for the preparation of precast or dry-cast concrete products, reinforced and non-reinforced.

7. The process of claim 6, wherein the precast or dry-cast concrete products are selected from the group consisting of masonry units, pavers, synthetic stone, bricks, hollow-core slabs, pipe, wall panels, fiber-cement boards, and retaining walls.

8. The process of claim 1, wherein the airtight, pressurizable curing enclosure is selected from the group consisting of kiln, chamber, autoclave, vessel, and tent, wherein the airtight, pressurizable enclosure is designed or modified to be air-tight and capable of withstanding marginal deviations in pressure both below and above ambient conditions.

9. The process of claim 1, wherein the door assembly is constructed from any one or a combination of materials that include polymer, plastic, aluminum, and/or steel.

10. The process of claim 1, wherein the first layer of Spray Polyurethane Foam (SPF) ranges in thickness from 25 to 50 mm, and the second layer of polyurea material ranges between 2 and 10 mm thickness, and wherein the composite lining is intended to alleviate internal stresses arising from the system's applied pressure differential and ensure air-tightness.

* * * * *